(12) United States Patent
Jing et al.

(10) Patent No.: US 10,708,554 B2
(45) Date of Patent: Jul. 7, 2020

(54) METHODS AND APPARATUS TO CONTROL SATELLITE EQUIPMENT

(71) Applicant: TEXAS INSTRUMENTS INCORPORATED, Dallas, TX (US)

(72) Inventors: Weibing Jing, Beijing (CN); Liang Zhang, Beijing (CN); Xianhui Dong, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 165 days.

(21) Appl. No.: 16/055,753

(22) Filed: Aug. 6, 2018

(65) Prior Publication Data

US 2019/0306469 A1 Oct. 3, 2019

Related U.S. Application Data

(63) Continuation of application No. PCT/CN2018/081764, filed on Apr. 3, 2018.

(51) Int. Cl.
*H04N 7/20* (2006.01)
*G05F 1/575* (2006.01)
(Continued)

(52) U.S. Cl.
CPC ............... *H04N 7/20* (2013.01); *G05F 1/575* (2013.01); *H04H 40/90* (2013.01); *H04N 21/6143* (2013.01)

(58) Field of Classification Search
CPC ...... H04N 7/20; H04N 21/6143; G05F 1/575; H04H 40/90
See application file for complete search history.

(56) References Cited

U.S. PATENT DOCUMENTS

| 2010/0075724 A1* | 3/2010 | Sivadas | H03G 3/3042 455/571 |
| 2013/0051481 A1* | 2/2013 | Tsuchida | H04H 40/90 375/257 |

(Continued)

FOREIGN PATENT DOCUMENTS

| CN | 102323446 A | 1/2012 |
| CN | 102723602 A | 10/2012 |
| CN | 206743465 U | 12/2017 |

OTHER PUBLICATIONS

Search Report for PCT Application No. PCT/CN2018/081764, dated Dec. 29, 2018, 4 pages.

(Continued)

*Primary Examiner* — Alexander Gee
(74) *Attorney, Agent, or Firm* — Mark Allen Valetti; Charles A. Brill; Frank D. Cimino

(57) ABSTRACT

Methods, apparatus, systems, and articles of manufacture are disclosed to enable Digital Satellite Equipment Control (DiSEqC) communication between an antenna and a processor. An example apparatus includes a receiver to be coupled to an antenna by a cable and configured to bidirectionally communicate with the antenna via a communication signal having a periodic waveform, wherein the receiver further includes a low dropout regulator (LDO) pass transistor to be coupled to the cable and configured to generate a current signal based on the periodic waveform of the communication signal, a current envelope detector circuit coupled to the LDO pass transistor configured to generate a voltage signal based on the current signal, and a processor. The processor is coupled to the current envelope detector circuit and configured to process the voltage signal generated by the current envelope detector.

20 Claims, 7 Drawing Sheets

(51) Int. Cl.
*H04N 21/61* (2011.01)
*H04H 40/90* (2008.01)
*G05F 1/46* (2006.01)

(56) References Cited

U.S. PATENT DOCUMENTS

2015/0227147 A1* 8/2015 Ivanov .................... G05F 1/575
                                                    323/280
2015/0286231 A1* 10/2015 Gerber ...................... G05F 1/56
                                                    323/281

OTHER PUBLICATIONS

English Machine Translation for CN206743465U, 6 pages.
English Machine Translation for CN102723602A, 7 pages.
English Machine Translation for CN102323446A, 4 pages.

* cited by examiner

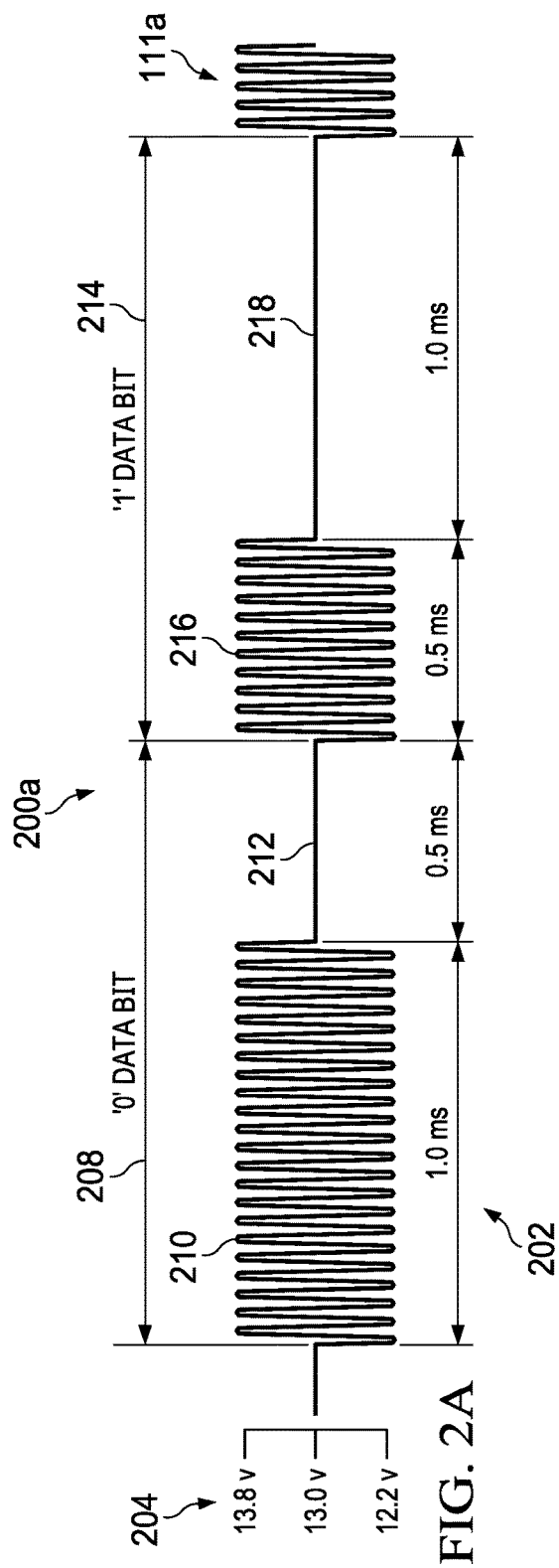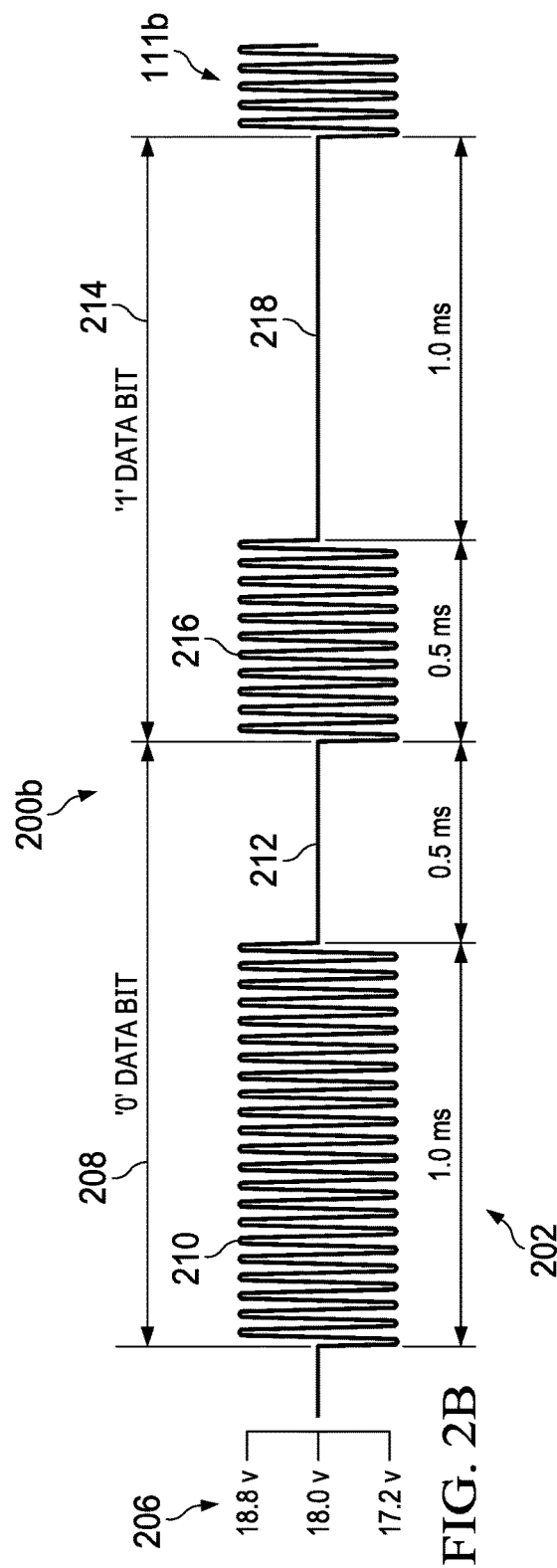

METHODS AND APPARATUS TO CONTROL SATELLITE EQUIPMENT

TECHNICAL FIELD

This disclosure relates generally to control systems, and, more particularly, to methods and apparatus to control satellite equipment.

BACKGROUND

Digital Satellite Equipment Control (DiSEqC) is a protocol utilized to enable communication between a receiver (e.g., a decoder, a set top box, etc.) and a signal switcher of an antenna (e.g., a satellite dish) through a high voltage coaxial cable. This communication is utilized to, for example, change the polarity of the antenna, and/or select different channels/programs. Using the DiSEqC 1.X communication protocol, data can be unidirectionally transferred from the receiver to the antenna.

In recent years, the next generation of DiSEqC communication, DiSEqC 2.X, has incorporated data transfer from the antenna to the receiver so that communication between the receiver and the antenna is bidirectional. Conventional methods to enable this bidirectional communication through the high voltage coaxial cable require additional components added to a low-noise block (LNB) voltage regulator included in the receiver. These components may include a switch, inductors, resistors, and capacitors. These components add cost and complexity to the LNB voltage regulator. Additionally, fine tuning of several of these components is also required.

SUMMARY

In described examples of an apparatus for controlling satellite equipment, the apparatus includes a receiver to be coupled to an antenna by a cable and configured to bidirectionally communicate with the antenna via a communication signal having a periodic waveform, wherein the receiver further includes a low dropout regulator (LDO) pass transistor to be coupled to the cable and configured to generate a current signal based on the periodic waveform of the communication signal, a current envelope detector circuit coupled to the LDO pass transistor configured to generate a voltage signal based on the current signal, and a processor. The processor is coupled to the current envelope detector circuit and configured to process the voltage signal generated by the current envelope detector.

In described examples of an apparatus for controlling satellite equipment, the apparatus includes a low dropout regulator (LDO) pass transistor to be coupled to an antenna configured to generate a current signal based on a communication signal having a periodic waveform received from the antenna, a current envelope detector coupled to the LDO pass transistor configured to generate a binary signal representative of the periodic waveform of the communication signal based on the current signal, and a processor. The processor is coupled to the current envelope detector and is configured to process the binary signal generated by the current envelope detector.

In described examples of methods of controlling satellite equipment, the method includes distributing a communication signal having a periodic waveform representative of communication from an antenna, sensing a current signal on a low dropout regulator (LDO) pass transistor correlated to the periodic waveform of the communication signal, converting the current signal to a binary signal based on a threshold, and processing the binary signal to determine content of the communication distributed by the antenna.

In described examples of non-transitory computer-readable medium comprising instructions for controlling satellite equipment that, when implemented, cause a machine to at least distribute a communication signal having a periodic waveform representative of communication from an antenna, sense a current signal on a low dropout regulator (LDO) pass transistor correlated to the periodic waveform of the communication signal, convert the current signal to a binary signal based on a threshold, and process the binary signal to determine content of the communication distributed by the antenna.

BRIEF DESCRIPTION OF THE DRAWINGS

FIG. 2A illustrates a first example DiSEqC signal distributed via the coaxial cable of FIG. 1.

FIG. 2B illustrates a second example DiSEqC signal distributed via the coaxial cable of FIG. 1.

DETAILED DESCRIPTION

Figure 1:
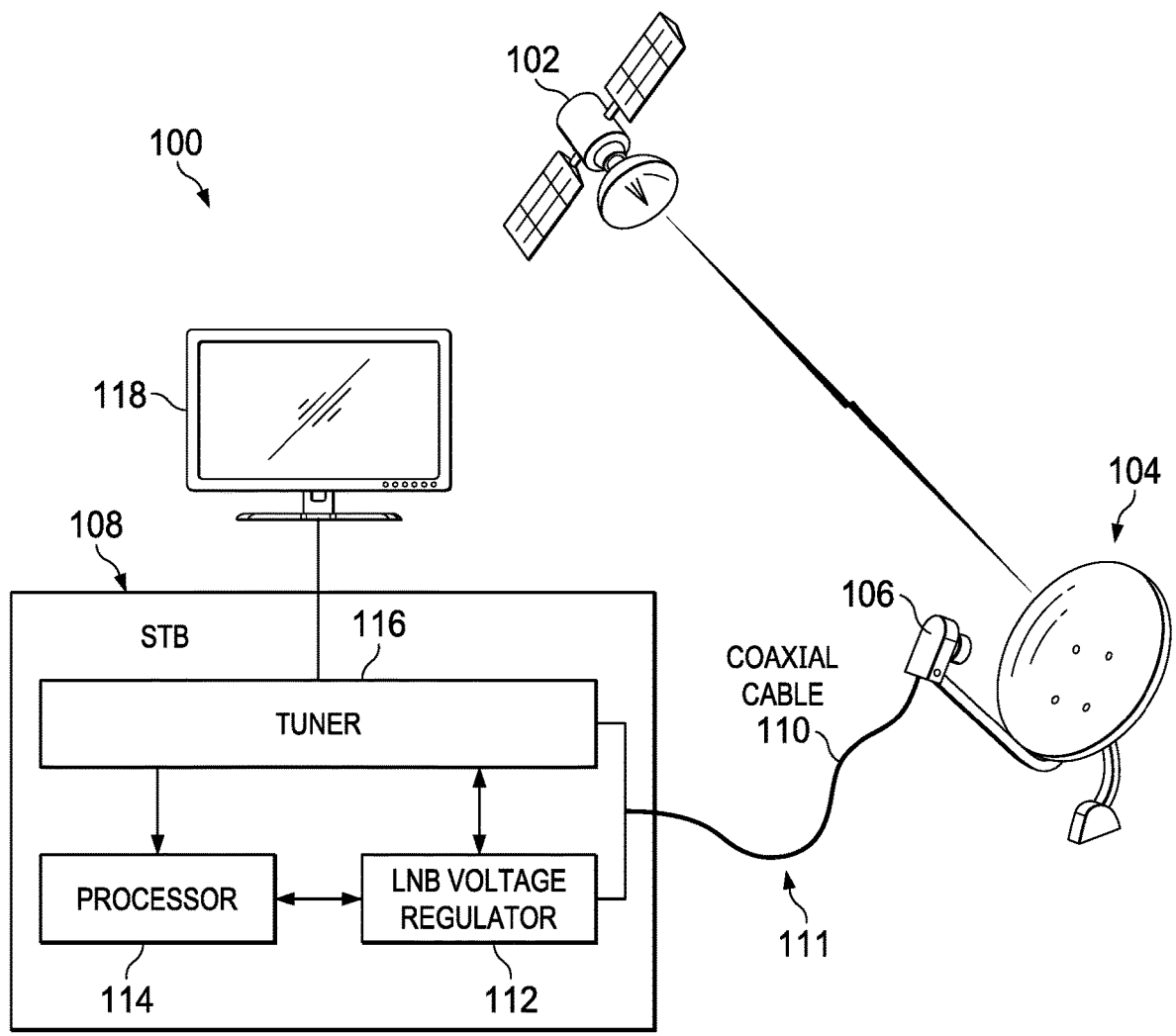
FIG. 1 illustrates an example antenna and an example receiver communicating via a coaxial cable. The receiver includes an example low noise block (LNB) voltage regulator in which the examples disclosed herein can be implemented.

The figures are not to scale. In general, the same reference numbers will be used throughout the drawing(s) and accompanying written description to refer to the same or like parts.

Many receivers and antennas utilize DiSEqC signals (e.g., messages) to enable communication between a receiver (e.g., set top box, decoder, etc.) and an antenna via a coaxial cable carrying a high voltage from the receiver to power the antenna. The DiSEqC signals/messages distributed from the receiver to the antenna can, for example, be utilized to change the polarity of the antenna, select different channels/programs. Utilizing DiSEqC 1.X communication, only unidirectional communication from the receiver to the antenna was possible. As such, the antenna was incapable of, for example, notifying the receiver of completion and/or failure to complete the received instructions.

To enable notifications from the antenna to the receiver, as well as the sending of other information, DiSEqC 2.X communication allows for bidirectional communication between the receiver and the antenna. However, in some implementations, DiSEqC 2.X communication requires additional components in a low noise block (LNB) voltage regulator included in the receiver in order to receive the DiSEqC signals from the antenna via the high voltage coaxial cable.

For example, conventional methods of enabling bidirectional DiSEqC communication included adding a high voltage MOSFET switch in parallel with an inductor, a resistor, and a capacitor to the LNB voltage regulator of the receiver. When the receiver distributes DiSEqC communication to the antenna, the MOSFET switch closes, shorting each of the inductor, the resistor, and the capacitor, thereby sending information on the high voltage coaxial cable.

Conversely, when the antenna is distributing DiSEqC communication to the receiver, the MOSFET switch opens and the antenna creates a voltage drop via a resistor. A series of voltage drops conveys information from the antenna to the receiver. This technique allows the signal from the satellite, once passed through an additional capacitor and a ripple detector, to be processed by the receiver. However, this solution requires a significant quantity of additional components and also requires tuning time to fine tune the circuit.

Examples disclosed herein utilize a current envelope detector to determine a current output from a low dropout regulator (LDO) included in the LNB voltage regulator, as opposed to detecting a voltage difference on the high voltage coaxial cable. In some examples, the current envelope detector may be a circuit including a current sensor to sense the current output from the LDO, and a resistor to generate a voltage based on the output of the current sensor. The voltage from the resistor goes to a low pass filter which may include a resistor and a capacitor to filter the voltage. The filtered voltage is provided to a comparator to compare the filtered and unfiltered voltages. In some examples, the comparator is a hysteresis comparator that generates a binary output and distributes the binary output representative of a DiSEqC signal to a processor included in the receiver.

In some other examples, the current envelope detector may be a processing unit that is capable of sensing the current output from the LDO. Further in such an example, the processing unit may further be capable of determining if the current output from the LDO satisfies at least one of a first threshold and a second threshold, and generating a binary signal based on the satisfaction status of the first and second thresholds to be output to the processor included in or otherwise implemented by the receiver.

As described herein in accordance with the teachings of this disclosure, the current envelope detector can have various configurations that may depend on a type of receiver and/or antenna. In examples disclosed herein, these configurations can be changed or altered to ensure proper transmission of DiSEqC signals between the receiver and the antenna.

Turning to FIG. 1, an example environment of use 100 includes an example satellite 102 transmitting a signal to be received by an example antenna 104. In some examples, the antenna 104 includes an example low noise block (LNB) 106 that converts the signal received from the satellite 102 to a signal for processing by a receiver 108.

The receiver 108 receives, via an example coaxial cable 110, the signal converted by the LNB 106. The signal from the LNB 106 includes one or more pieces of media content and, in some examples, may include DiSEqC signals 111. Examples of the DiSEqC signals 111 are described in further detail in conjunction with FIGS. 2A and 2B. The DiSEqC signals 111 are present on the coaxial cable 110 with the media content signal. In some examples, the media content signal and the DiSEqC signals 111 are at substantially differing frequencies.

Figure 3:
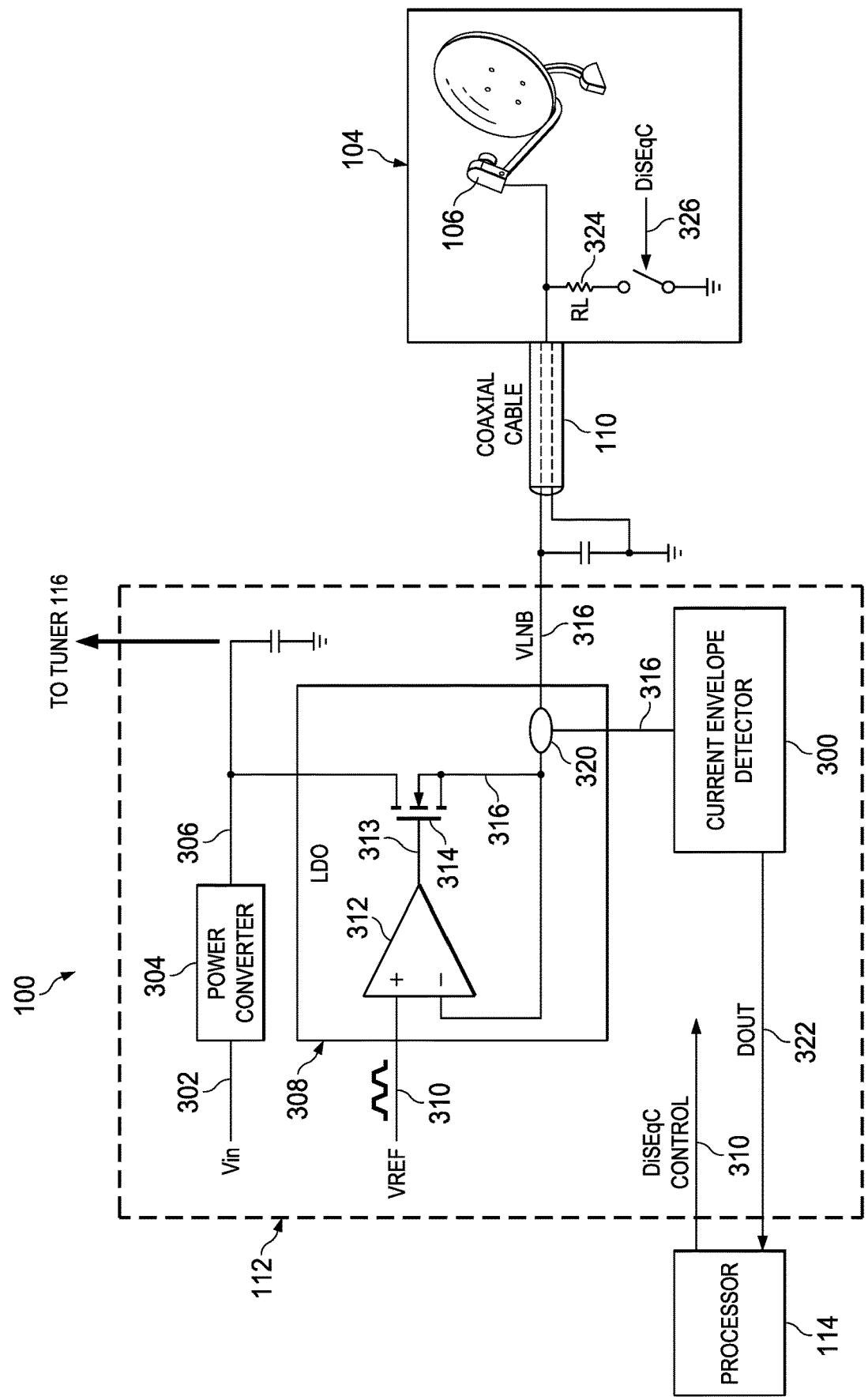
FIG. 3 is a schematic illustration of the example LNB voltage regulator and the example antenna of FIG. 1.

In some examples, the receiver 108 includes an example LNB voltage regulator 112, described in further detail in conjunction with FIG. 3, wherein the LNB voltage regulator 112 provides power to the antenna 104 in addition to sending and/or receiving DiSEqC signals 111 between the antenna 104 and the receiver 108.

The receiver 108 further includes an example processor 114 coupled (e.g., connected) to the LNB voltage regulator 112. In some examples, the processor 114 decodes the DiSEqC signals 111 received from the antenna 104 via the LNB voltage regulator 112 and generates DiSEqC signals 111 to be sent to the antenna 104 via the LNB voltage regulator 112. In some examples, the DiSEqC signals 111 instruct a position and/or polarity change of the antenna 104 and/or to notify the receiver 108 that the position and/or polarity change requested by the antenna 104 is complete.

The receiver 108 further includes an example tuner 116 coupled to the LNB voltage regulator 112 and the processor 114, wherein the tuner 116 processes the media content signal received from the LNB 106. Additionally, the receiver 108 distributes the signal processed by the tuner 116 to an example display 118, the display 118 coupled to the tuner 116. In some examples, the processed signal includes at least one of an audio signal and a video signal for output by the display 118.

FIGS. 2A and 2B show plots 200a and 200b of example DiSEqC signals 111a and 111b, respectively. The plots 200a, 200b each include a horizontal axis 202 corresponding to a time range. In the illustrated example of FIGS. 2A and 2B, the horizontal axis 202 corresponds to a time range of 3 milliseconds (e.g., 0.003 seconds).

Further, the plot 200a includes an example vertical axis 204 and the plot 200b includes an example vertical axis 206, respectively. In the illustrated example, the vertical axes 204, 206 correspond to voltages. For example, the first vertical axis 204 corresponds to a voltage range of 1.6 Volts, spanning from 12.2 Volts to 13.8 Volts and centered about 13.0 Volts. The vertical axis 206 corresponds to a voltage range of 1.6 Volts, spanning from 17.2 Volts to 18.8 Volts and centered about 18.0 Volts.

The signals 111a includes a DiSEqC waveform having a direct current (DC) voltage offset of 13 V, and the signal 111b includes a DiSEqC waveform having a DC voltage offset of 18 V, the DC voltages used to power the antenna 104. While in the illustrated example the signals 111a, 111b are shown as having a DC offset of 13 Volts and 18 Volts, respectively, any DC voltage up to 20 Volts (e.g., 2 Volts, 6 Volts, 19 Volts, etc.) that is capable of powering the antenna 104 may be used.

Additionally, each of the signals 111a, 111b shows an example DiSEqC modulation scheme. In the illustrated modulation scheme, a 'logical 0' data bit 208 is defined by an approximately 1 millisecond tone 210 defined by a 22-Kilohertz periodic waveform (e.g., a sinusoidal waveform, a trapezoidal waveform, a square signal, etc.) with a magnitude of approximately 1.6 Volts, and approximately 0.5 milliseconds of stop 212. Conversely, a 'logical 1' data bit 214 is defined by an approximately 0.5 millisecond tone 216 defined by a 22-Kilohertz periodic waveform with a magnitude of approximately 1.6 Volts, and a 1 millisecond stop 218. In the illustrated example, the DiSEqC waveform has a frequency of approximately 22-Kilohertz. As such, the approximately 1 millisecond tone 208 contains 22 cycles of the periodic waveform and the 0.5 millisecond tone 216 contains 11 cycles of the periodic waveform.

FIG. 3 is a schematic illustration of the example LNB voltage regulator 112 and the example antenna 104 of FIG. 1. The example LNB voltage regulator 112 includes an example current envelope detector 300 that may be implemented as described in further detail in conjunction with FIGS. 4 and 5.

In some examples, the LNB voltage regulator 112 receives an input voltage 302 at an example power converter 304. In some examples, the power converter 304 converts the input voltage 302, which in some examples is a board voltage (e.g., 5 volts, 12 volts, 24 volts, 120 volts, etc.), to a power voltage 306 that is required for the LNB 106 of FIG. 1. For example, the input voltage 302 may be greater than the power voltage 306. In such examples, the power converter 304 will step down the input voltage 302 to the power voltage 306. Conversely, the input voltage 302 may be less than the power voltage 306. In such examples, the power converter 304 steps up the input voltage 302 to the power voltage 306.

The power voltage 306 is further passed to an example low dropout (LDO) regulator 308 that is coupled to the power converter 304. The LDO 308 additionally receives a reference voltage 310 representative of a DiSEqC waveform distributed by the processor 114.

In some examples, the LDO 308 further includes an example difference amplifier 312 that passes an output 313 to an example LDO pass transistor 314. In some examples, the output 313 of the difference amplifier 312 is based on a difference between a ground voltage and the reference voltage 310. Thus, in such examples, the difference seen by the difference amplifier 312 is substantially negligible when there is no DiSEqC waveform on the reference voltage 310. Conversely, the difference seen by the difference amplifier 312 is not negligible when there is a DiSEqC waveform on the reference voltage 310, and the difference instead tracks the DiSEqC waveform. Based upon this schema, the output 313 of the difference amplifier 312 tracks the DiSEqC waveform and controls the LDO pass transistor 314, which outputs an LNB voltage 316 and an LDO pass transistor output current that each vary with the reference voltage 310 and are received by at least one of the LNB 106 and the current envelope detector 300. In some examples, the current envelope detector 300 determines an envelope of the periodic DiSEqC waveform, for example the DiSEqC waveforms of the signals 111a, 111b of FIGS. 2A and 2B, by tracking the peaks of the periodic DiSEqC waveform.

For example, the output 313 of the difference amplifier 312 may drive the LDO pass transistor 314 such that the LNB voltage 316 remains constant. So, for example, under steady state operating conditions (e.g., the power voltage 306 remains constant), the LDO pass transistor 314 will act as a resistor.

The LDO pass transistor 314 outputs the LNB voltage 316 and the LDO pass transistor output current. In some examples, the LNB voltage 316 and the LDO pass transistor output current are representative of communication sent from the processor 114 to the antenna 104 and are routed to at least one of the antenna 104 and the current envelope detector 300 by a signal splitter 320, the signal splitter 320 coupled to each of the LDO pass transistor 314, the current envelope detector 300, and the coaxial cable 110.

Figure 4:
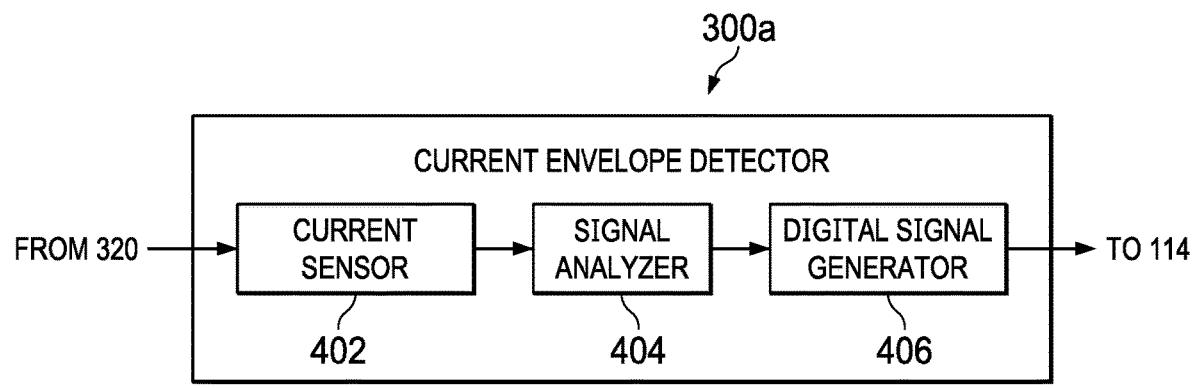
FIG. 4 is a block diagram of a first example implementation of the example current envelope detector of FIG. 3.
Figure 5:
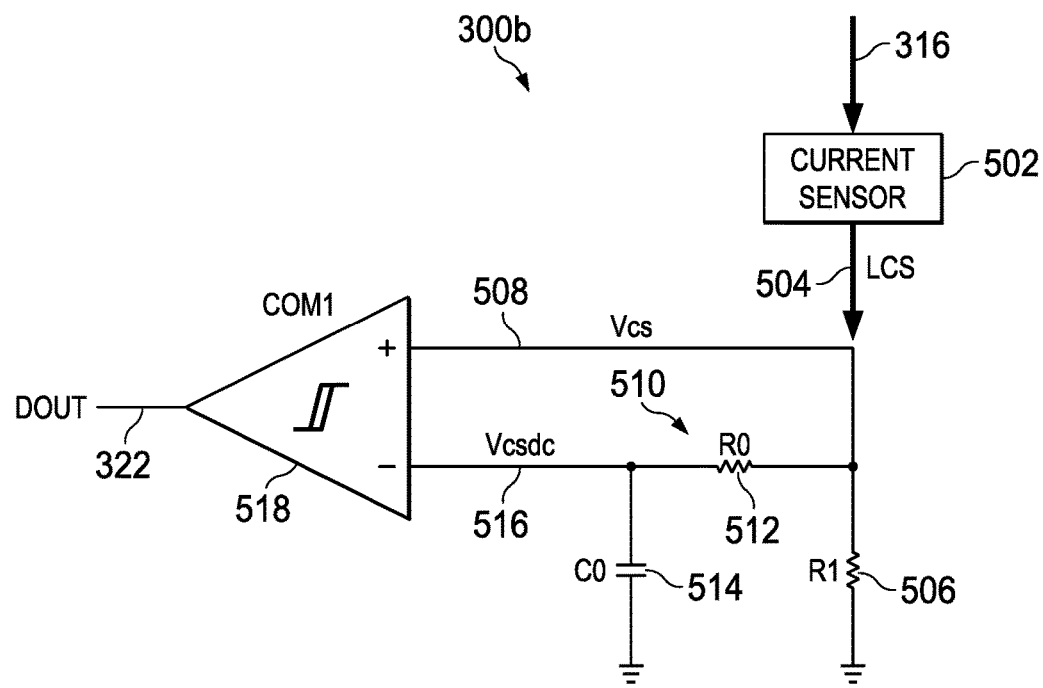
FIG. 5 is a schematic illustration of a second example implementation of the example current envelope detector of FIG. 3.

The current envelope detector 300, two examples of which are further described in conjunction with FIGS. 4 and 5, converts communication sent from the antenna 104 to a signal that can be processed by the processor 114 (i.e., the current envelope detector 300 is utilized when the antenna 104 is outputting a DiSEqC signal, but not when the receiver 108 is outputting a DiSEqC signal). Additionally, the current envelope detector 300 is coupled to the processor 114 and can distribute a digital output 322 to the processor 114 based on the LDO pass transistor output current.

In some examples, when a resistor 324 included in the antenna 104 is enabled, a DiSEqC signal 326 is distributed by the antenna 104 (e.g., to distribute a confirmation notification to the receiver 108). The DiSEqC signal 326 modulates the LNB voltage 316 and the LDO pass transistor current. The current envelope detector 300, in some examples, receives the modulated LNB voltage 316 and the LDO pass transistor current and outputs the digital output 322 as a binary signal that is representative of the DiSEqC signal 326 received from the antenna 104. By way of the reference voltage 310 and the DiSEqC signal 326, the bidirectional communication required of DiSEqC 2.X is enabled.

FIG. 4 is a block diagram of one implementation of a current envelope detector 300a that may be used in FIG. 3. The current envelope detector 300a can, in some examples such as the illustrated example of FIG. 4, include an example current sensor 402, an example signal analyzer 404, and an example digital signal generator 406.

The example current sensor 402, included in the current envelope detector 300a, receives the LDO pass transistor output current from the LDO pass transistor 314. The current sensor 402 interprets the LDO pass transistor output current to a value in a desired format. In some examples, the current sensor 402 generates an analog electrical signal (e.g., a voltage amplitude, a current measurement, etc.) based on the LDO pass transistor output current received from the LDO pass transistor 314. Additionally or alternatively, the current sensor 402 may generate a digital signal (e.g., a hex value based on a communication protocol data packet, a set of discrete values (e.g., 16 bit signal, 64 bit signal, etc.), etc.) based on the LDO pass transistor output current received from the LDO pass transistor 314. The current sensor 402 distributes the processed signal to the signal analyzer 404.

The example signal analyzer 404, included in the current envelope detector 300a, analyzes the processed signal received from the current sensor 402, wherein the processed signal is representative of the LDO pass transistor output current. In some examples, analyzing the processed signal further includes comparing the processed signal to one or more thresholds.

In some examples, the signal analyzer 404 determines the one or more threshold values based upon an input from, for example, a technician setting up the example receiver 108 of FIG. 1. Additionally or alternatively, the one or more threshold values may be automatically calculated values that are calculated based upon one or more characteristics of the LDO pass transistor output current. In some examples, a first threshold may be less than an upper limit of the processed signal received from the current sensor 402 by a tolerance and a second threshold may be greater than a lower limit of the processed signal received from the current sensor 402 by a tolerance. In such examples, each of the first threshold and the second threshold would lie within the bounds corresponding to a full-scale range of the processed signal received from the current sensor 402.

Utilizing each of the first and second thresholds, the signal analyzer 404 generates a comparison of the processed signal received from the current sensor 402 to determine whether the processed signal satisfies at least one of the first and second thresholds. In some examples, the processed signal may satisfy the first threshold when the voltage of the processed signal is a quantity greater than (e.g., above) the first threshold. Additionally or alternatively, the processed signal may satisfy the first threshold when the value of the processed signal is a quantity greater than the first threshold for a determined amount of time (e.g., 0.005 milliseconds, 0.1 milliseconds, etc.) and/or a determined number of processing cycles (e.g., 3 processing cycles, 20 processing cycles, etc.) such that the signal analyzer 404 decreases the likelihood of any erroneous threshold satisfaction readings.

Additionally, the processed signal may satisfy the second threshold when the voltage of the processed signal is a quantity less than (e.g., below) the second threshold. Additionally or alternatively, the processed signal may satisfy the second threshold when the voltage of the processed signal is a quantity less than the second threshold for a determined amount of time (e.g., 0.005 milliseconds, 0.1 milliseconds, etc.) and/or a determined number of processing cycles (e.g., 3 processing cycles, 20 processing cycles, etc.) such that the signal analyzer 404 decreases the likelihood of any erroneous threshold satisfaction readings.

In response to determining whether the processed signal received from the current sensor 402 satisfies the first threshold or the second threshold, the signal analyzer 404 distributes a threshold satisfaction notification (e.g., the processed signal satisfies the first threshold, the processed signal satisfies the second threshold, the processed signal does not satisfy either threshold, etc.) to the digital signal generator 406.

The example digital signal generator 406, included in the current envelope detector 300a, generates a binary signal for distribution to the processor 114, wherein the value of the binary signal is based on the threshold satisfaction notification received from the signal analyzer 404.

In some examples, the digital signal generator 406 sets the binary signal high (e.g., a binary 1, "true", a supply voltage, etc.) when the processed signal is determined to satisfy the first threshold. Additionally in such examples, the digital signal generator 406 sets the binary signal low (e.g., a binary 0, "false", a reference voltage, etc.) when the processed signal is determined to satisfy the second threshold. Additionally, the digital signal generator 406 sets the binary signal to the previous value (e.g., low when the previous value is low, high when the previous value is high, etc.) when the processed signal is determined to not satisfy either of the first and second thresholds. This has the effect of generating an oscillatory binary signal which oscillates at a corresponding to the frequency of the LDO pass transistor output current. Upon setting of the binary signal, the digital signal generator 406 distributes the binary signal to the processor 114.

In some examples, the digital signal generator 406 may further determine an envelope of the generated binary signal, wherein the envelope is based on the magnitude of the binary signal. So, for example, when the generated binary signal is an oscillatory signal, the envelope of the signal is a 'logical 1' for a time period that the binary signal is oscillatory. Conversely, the envelope of the signal is a 'logical 0' for a time period that the binary signal is not oscillatory (e.g., the binary signal is a constant value). In such examples, the digital signal generator 406 distributes the envelope of the generated binary signal to the processor 114.

While an example manner of implementing the current envelope detector 300 is illustrated in FIG. 4, one or more of the elements, processes, and/or devices illustrated in FIG. 4 may be combined, divided, re-arranged, omitted, eliminated, and/or implemented in any other way. Further, the example current sensor 402, the example signal analyzer 404, the example digital signal generator 406, and/or, more generally, the example current envelope detector 300a of FIG. 4 may be implemented by hardware, software, firmware, and/or any combination of hardware, software, and/or firmware. Thus, for example, any of the example current sensor 402, the example signal analyzer 404, the example digital signal generator 406, and/or, more generally, the example current envelope detector 300a of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example current sensor 402, the example signal analyzer 404, and/or the example digital signal generator 406 is/are hereby expressly defined to include a non-transitory computer readable storage device or storage disk such as a memory, a digital versatile disk (DVD), a compact disk (CD), a Blu-ray disk, etc., including the software and/or firmware. Further still, the example current envelope detector 300a of FIG. 4 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 5 is a schematic of an example current envelope detector 300b that may be used in FIG. 3. The current envelope detector 300b, in some examples, receives the LDO pass transistor output current from the LDO pass transistor 314.

The current envelope detector 300b includes a current sensor 502 that outputs a sensed current 504 that correlates to the LDO pass transistor output current by a gain value of the current sensor 502. In some examples, the gain may be less than 1 and the sensed current 504 is less than the LDO pass transistor output current. In other examples, the gain may be greater than 1 and the sensed current 504 is greater than the LDO pass transistor output current.

In some examples, the current sensor 502 may be a non-invasive current sensor (e.g., the current sensor 502 does not affect the LDO pass transistor output current received by the current sensor 502) and may utilize a magnetic field (e.g., a Hall effect sensor) to sense the LDO pass transistor output current. Additionally or alternatively, the current sensor 502 may be an invasive current sensor (e.g., the current sensor 502 does affect the LDO pass transistor output current received by the current sensor 502) and utilize a resistor to sense the LDO pass transistor output current. Additionally or alternatively, any form of current sensing may be utilized by the current sensor 502.

The current envelope detector 300b of FIG. 5 further includes a resistor 506 coupled to the current sensor 502. The resistor 506 generates a current sense voltage 508 based on the sensed current 504, wherein the current sense voltage 508 is substantially linearly correlated to a resistance (e.g., 2 ohms, 4 ohms, etc.) of the resistor 506.

Additionally, the current sense voltage 508 is input to an example low pass filter 510. The low pass filter 510, in the illustrated example of FIG. 5, includes a resistor 512 and a capacitor 514. In some examples, the resistor 512 and the capacitor 514 are sized (e.g., a resistance value (e.g., 2 ohms, 3 ohms, etc.) of the resistor 512 and a capacitance value (e.g., 2 microfarads, 30 microfarads, etc.) of the capacitor 514) to decrease an amplitude of a periodic waveform (e.g., an alternating current (AC) signal) carried on the current sense voltage 508. The low pass filter outputs a filtered current sense voltage 516, wherein the amplitude of the filtered current sense voltage 516 may be less than the amplitude of the current sense voltage 508. In some examples, the amplitude of the filtered current sense voltage 516 is decreased by a quantity such that the filtered current sense voltage 516 is a substantially DC voltage, the magnitude of the voltage approximately equal to an average voltage of the current sense voltage 508. This enables a comparison of the current sense voltage 508 and the filtered current sense voltage 516.

Each of the current sense voltage 508 and the filtered current sense voltage 516 are input into an example comparator 518 coupled to each of the resistor 506, the low pass filter 510, and the processor 114. Further, the comparator 518 outputs the digital output 322 based upon the values of the current sense voltage 508 and the filtered current sense voltage 516.

For example, the comparator 518 will set the digital output 322 "high" (e.g., a supply voltage) when the comparator 518 determines that the current sense voltage 508 is greater than the filtered current sense voltage 516 and the comparator 518 will set the digital output 322 "low" (e.g., a reference voltage that is lower than the supply voltage) when the comparator 518 determines the current sense voltage 508 is less than the filtered current sense voltage 516.

In some examples, the comparator 518 may be a hysteresis comparator defining a hysteresis voltage. In such examples, the comparator 518 will set the digital output 322 "high" (e.g., the supply voltage) when the comparator 518 determines that the current sense voltage 508 is greater than the filtered current sense voltage 516 added to the hysteresis voltage. Conversely, the comparator 518 will set the digital output 322 "low" (a reference voltage that is lower than the supply voltage) when the comparator 518 determines that the current sense voltage 508 is less than the hysteresis voltage subtracted from the filtered current sense voltage 516. In such examples, utilizing the hysteresis voltage in the comparator 518 decreases a likelihood of erroneously setting the digital output 322. The comparator 518 outputs the digital output 322 to the processor 114 of the receiver 108.

Figure 6:
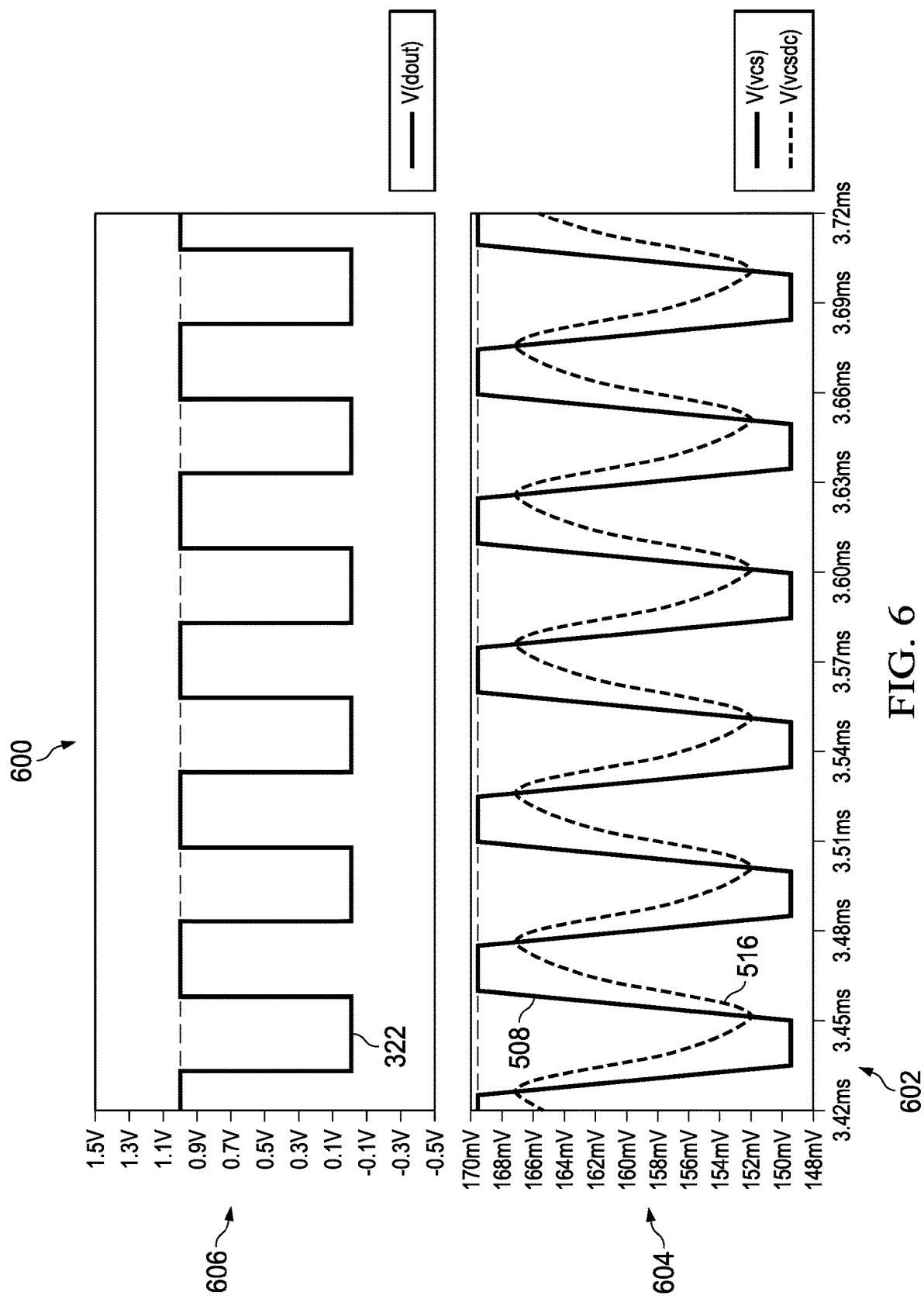
FIG. 6 is a plot of voltage signals associated with the example current envelope detector of FIG. 5.

FIG. 6 is a diagram including an example chart 600 detailing voltage signals associated with the example current envelope detector 300b of FIG. 5 when the current envelope detector 300b is receiving a 22 Kilohertz DiSEqC tone as illustrated by the example signals 111a and 11b of FIG. 2. The chart 600 includes a horizontal axis 602 corresponding to a time range. In the illustrated example of FIG. 3, the horizontal axis 602 corresponds to a time range of 0.3 milliseconds (e.g., 0.0003 seconds), spanning from 3.42 milliseconds (e.g., 0.00342 seconds) to 3.72 milliseconds (e.g., 0.00372 seconds).

The chart 600 further includes an example first vertical axis 604 and an example second vertical axis 606. In the illustrated example, each of the first and second vertical axes 604 and 606 correspond to voltages. For example, the first vertical axis 604 corresponds to a voltage range of 22 millivolts (e.g., 0.022 Volts), spanning from 148 millivolts (e.g., 0.148 Volts) to 170 millivolts (e.g., 0.170 Volts). In some examples, the voltage range of the first vertical axis 604 is based upon the full-scale range of at least one of the current sense voltage 508 and the filtered current sense voltage 516.

Additionally, the second vertical axis 606 corresponds to a voltage range of 2 Volts, spanning from −0.5 Volts to 1.5 Volts. In some examples, the voltage range of the second vertical axis 606 is based upon the full-scale range of the digital output 322.

The current sense voltage 508 includes a substantially periodic waveform repeating at approximately 22 Kilohertz (e.g., a period of approximately 0.045 seconds), indicative of a DiSEqC tone (for example, the 1 millisecond tone 210 and the 0.5 millisecond tone 216 included in the DiSEqC signals 111a, 111b of FIGS. 2A and 2B) being received from the antenna 104 of FIG. 1. While in the illustrated example the full-scale range of the current sense voltage 508 is approximately 20 millivolts centered about 160 millivolts, the full-scale range and center point of the current sense voltage 508 can be any values of voltage corresponding to the gain (e.g., 1/k, k, etc.) of the example current sensor 502 of FIG. 5.

Looking to the filtered current sense voltage 516, the profile of the filtered current sense voltage 516 is based on the current sense voltage 508 (periodic waveform repeating at approximately 22 Kilohertz (e.g., with a period of approximately 0.045 seconds corresponding to the 1 millisecond tone 210 and the 0.5 millisecond tone 216 included in the DiSEqC signals 111a, 111b of FIGS. 2A and 2B) in the illustrated example of FIG. 6) passing through the example low pass filter 510 of FIG. 5. While in the illustrated example of FIG. 6 the filtered current sense voltage 516 has an amplitude of approximately 16 millivolts, the amplitude of the filtered current sense voltage 516 can vary with sizing of the example resistor 512 and the example capacitor 514 included in the low pass filter 510.

For example, based upon a resistance of the resistor 512 and a capacitance of the capacitor 514 decreasing, the amplitude of the filtered current sense voltage 516 may increase.

Conversely, for example, based upon a resistance of the resistor 512 and a capacitance of the capacitor 514 increasing, the amplitude of the filtered current sense voltage 508 may decrease. In some examples, the amplitude may decrease to a substantially negligible value (e.g., 0 millivolts, 2 millivolts, etc.) and the filtered current sense voltage 516 may be substantially similar to a direct-current (DC) signal.

Looking to the digital output 322 output from the comparator 518 and distributed to the processor 114, the profile of the digital output 322 is based on the profiles of the current sense voltage 508 and the filtered current sense voltage 516 input to the comparator 518. In such examples, the digital output 322 is "high" (a value of approximately 1 Volt in the illustrated example of FIG. 3) when the current sense voltage 508 is greater than the filtered current sense voltage 516. Conversely, the digital output 322 is "low" (a value of approximately 0 Volts in the illustrated example of FIG. 6) when the current sense voltage 508 is less than the filtered current sense voltage 516.

In some examples, the comparator 518 may be a hysteresis comparator defining a hysteresis voltage. In such examples, the digital output 322 is "high" (a value of approximately 1 Volt in the illustrated example of FIG. 6)

when the current sense voltage 508 is greater than the filtered current sense voltage 516 added to the hysteresis voltage. Conversely, the digital output 322 is "low" (a value of approximately 0 Volts in the illustrated example of FIG. 6) when the current sense voltage 508 is less than the hysteresis voltage subtracted from the filtered current sense voltage 516. So, for example, the digital output 322 is a binary signal that corresponds to the 1 millisecond tone 210 and the 0.5 millisecond tone 216 included in the DiSEqC signals 111a, 111b of FIGS. 2A and 2B.

Figure 7:
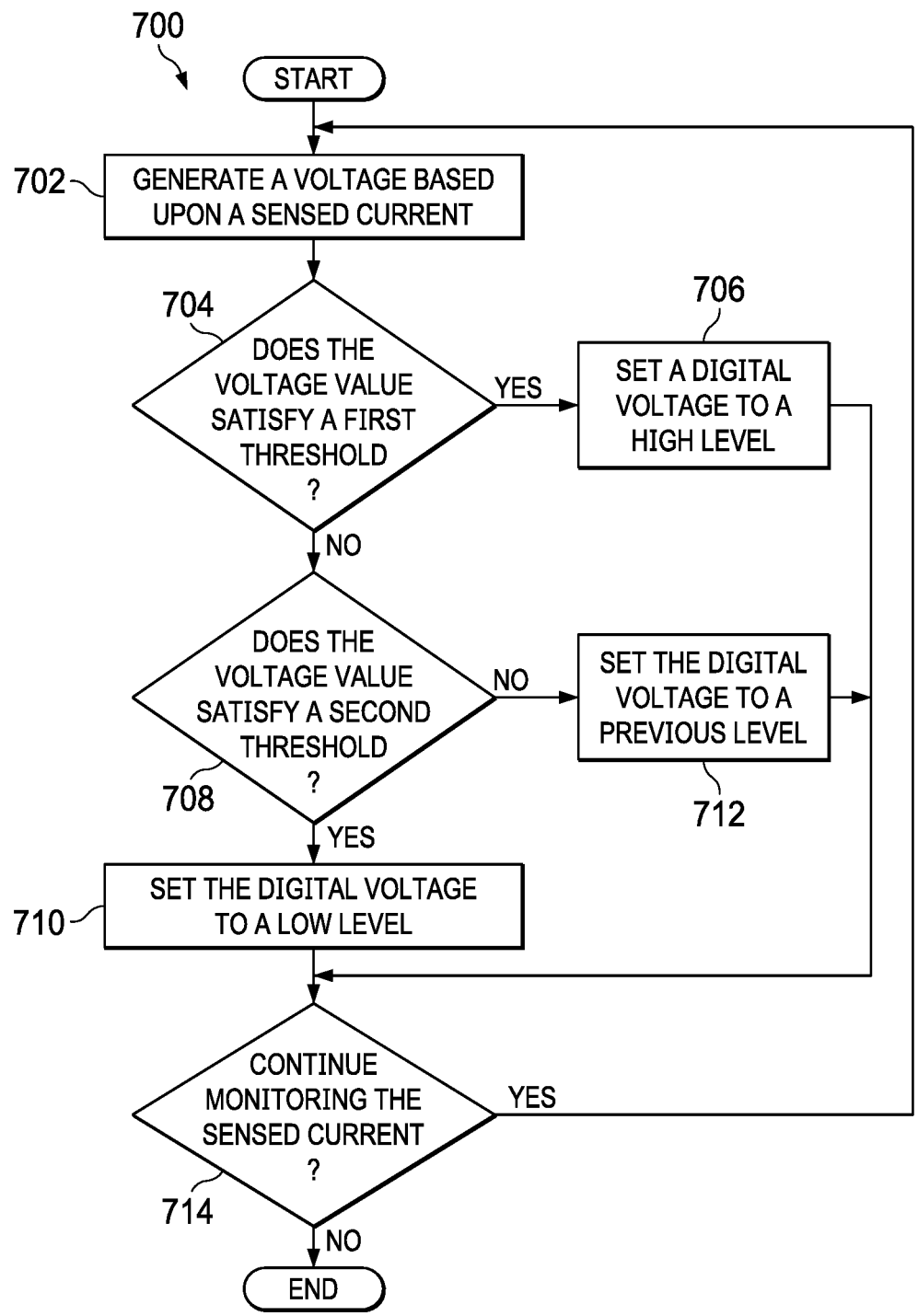
FIG. 7 is a flowchart representative of machine readable instructions that may be executed to implement the current envelope detector of FIGS. 3 and 4.

A flowchart representative of example hardware logic or machine readable instructions for implementing the current envelope detector 300a of FIG. 4 is shown in FIG. 7. The machine readable instructions may be a program or portion of a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example current envelope detector 300a may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example program 700 of FIG. 7 begins at block 702. At block 702, the example current sensor 402 of FIG. 4 generates a voltage based upon the LDO pass transistor output current. For example, the voltage may scale linearly with the LDO pass transistor output current based upon a gain of the current sensor 402. In some examples, the current sensor 402 distributes the voltage to the signal analyzer 404.

At block 704, in response to receiving the voltage from the current sensor 402, the signal analyzer 404 determines whether the voltage satisfies a first threshold. In some examples, the voltage satisfies the first threshold when the voltage is greater than the first threshold. Additionally or alternatively, the voltage may satisfy the first threshold when the voltage is greater than the first threshold for a period of time and/or a number of sensing cycles.

In some examples, the signal analyzer 404 distributes a threshold satisfaction notification to the example digital signal generator 406. In response to the voltage satisfying the first threshold, processing proceeds to block 706. Conversely, in response to the voltage not satisfying the first threshold, processing proceeds to block 708.

At block 706, in response to receiving a notification stating the voltage satisfies the first threshold from the signal analyzer 404, the digital signal generator 406 sets the digital output 322 to a high level (e.g., a binary or logical "1", true, etc.). The digital output 322 may be a binary signal. In some examples, setting the digital output 322 to a high value further includes setting the digital output 322 to a supply voltage (e.g., 1 Volt, 5 Volts, 12 Volts, etc.) representative of the binary "1" (e.g., high, true, etc.). In some examples at block 706, the digital signal generator 406 distributes the digital output 322 to the processor 114 and processing proceeds to block 714.

At block 708, the signal analyzer 404 determines whether the voltage satisfies a second threshold. In some examples, the voltage satisfies the second threshold when the voltage is less than the second threshold. Additionally or alternatively, the voltage may satisfy the first threshold when the voltage is less than the second threshold for a period of time and/or a number of sensing cycles.

In some examples, the signal analyzer 404 distributes a threshold satisfaction notification to the example digital signal generator 406. In response to the voltage satisfying the second threshold, processing proceeds to block 710. Conversely, in response to the voltage not satisfying the second threshold (e.g., the voltage does not satisfy either of the first threshold or second threshold), processing proceeds to block 712.

At block 710, in response to receiving a notification stating the voltage satisfies the second threshold from the signal analyzer 404, the digital signal generator 406 sets the digital output 322 to a low level (e.g., a binary or logical "0", false, etc.). The digital output 322 may be a binary signal. In some examples, setting the digital output 322 to a low value further includes setting the digital output 322 to a reference voltage (e.g., 0 Volts, 1 Volts, etc.) representative of the binary "0" (e.g., low, false, etc.). Further in such examples, the reference voltage may be a ground voltage (e.g., 0 Volts+/−0.25 Volts). In some examples at block 710, the digital signal generator 406 distributes the digital output 322 to the processor 114 and processing proceeds to block 714.

At block 712, in response to receiving a notification stating the voltage does not satisfy either of the first and second thresholds from the signal analyzer 404, the digital signal generator 406 sets the digital output 322 to a previous value (e.g., a binary "0" or "1", true or false, high or low, etc.). The digital output 322 may be a binary signal. In some examples at block 712, the digital signal generator 406 distributes the digital output 322 to the processor 114 and processing proceeds to block 714.

At block 714, the current envelope detector 300a determines whether it is desired to continue monitoring the LDO pass transistor output current. In response to determining it is desired to continue monitoring the LDO pass transistor output current, processing returns to block 702 of the example program 700. Conversely, in response to determining it is no longer desired to monitor the LDO pass transistor output current, the example program 700 of FIG. 7 ends.

Figure 8:
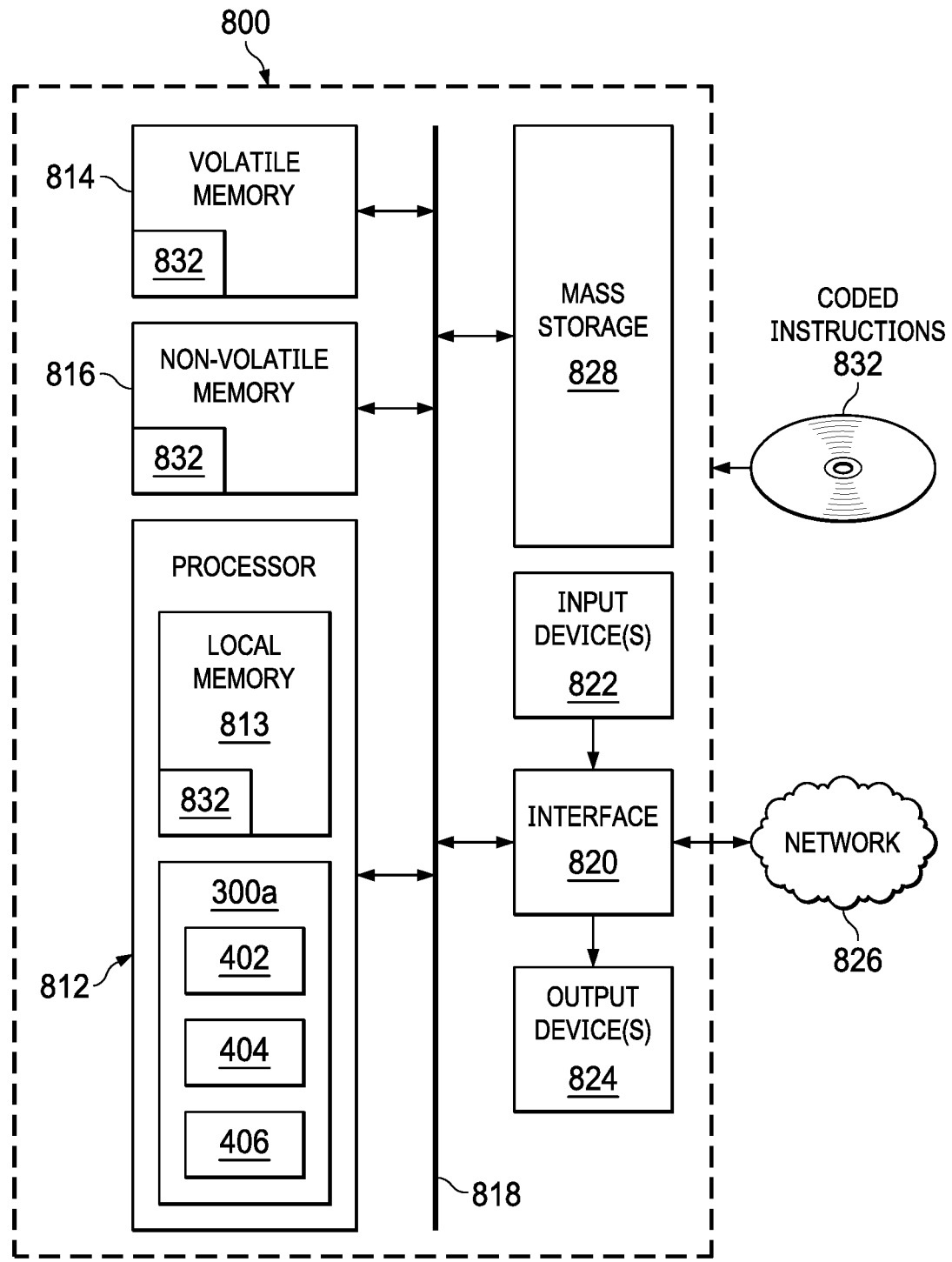
FIG. 8 is a block diagram of an example processing platform structured to execute the instructions of FIG. 7 to implement the current envelope detector of FIGS. 3 and 4.

FIG. 8 is a block diagram of an example processor platform 800 structured to execute the instructions of FIG. 7 to implement the apparatus of FIG. 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example current sensor 402, the example signal analyzer 404, and the example digital signal generator 406.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 680 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable bidirectional DiSEqC (Digital Satellite Equipment Control) 2.X communication between a receiver and an antenna via a high voltage coaxial cable with a minimal number of components and tuning time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a receiver to be coupled to an antenna by a cable and configured to bidirectionally communicate with the antenna via a communication signal having a periodic waveform, wherein the receiver further includes:
   a low dropout regulator (LDO) pass transistor to be coupled to the cable and configured to generate a current signal based on the periodic waveform of the communication signal;
   a current envelope detector circuit coupled to the LDO pass transistor configured to generate a voltage signal based on the current signal; and
   a processor coupled to the current envelope detector circuit configured to process the voltage signal generated by the current envelope detector.

2. The apparatus of claim 1, wherein the current signal includes a first current signal and the voltage signal includes a first voltage signal and wherein the current envelope detector further includes:
   a current sensor configured to generate a second current signal based on the first current signal, wherein the first and second current signals are correlated by a gain of the current sensor;
   a first resistor coupled to the current sensor configured to generate a second voltage signal corresponding to the second current signal;
   a low pass filter coupled to the first resistor, the low pass filter configured to generate a third voltage signal filtered from the second voltage signal; and a comparator coupled to the first resistor, the low pass filter, and the processor, the comparator configured to:
compare the second voltage signal and the third voltage signal; and
output the first voltage signal to the processor, the first voltage signal based upon the comparison of the second voltage signal and the third voltage signal.

3. The apparatus of claim 2, wherein the current sensor includes at least one of an invasive current sensor including a resistor, a non-invasive current sensor including a hall effect sensor, or any combination thereof.

4. The apparatus of claim 2, wherein the comparator includes a hysteresis comparator configured to define a fourth voltage signal.

5. The apparatus of claim 4, wherein the first voltage signal includes a binary signal that goes high when the second voltage signal is greater than the fourth voltage signal added to the third voltage signal and goes low when the second voltage signal is less than the fourth voltage signal subtracted from the third voltage signal.

6. The apparatus of claim 5, wherein the comparator is configured to generate an envelope of the first voltage signal and distribute the envelope of the first voltage signal to the processor.

7. The apparatus of claim 5, wherein at least one of the first voltage signal and the envelope of the first voltage signal received by the processor is representative of a Digital Satellite Equipment Control (DiSEqC) signal distributed by the antenna.

8. The apparatus of claim 1, wherein the periodic waveform of the communication signal is offset by a direct current (DC) voltage generated by a power converter for powering the antenna.

9. An apparatus comprising:
a low dropout regulator (LDO) pass transistor to be coupled to an antenna configured to generate a current signal based on a communication signal having a periodic waveform received from the antenna;
a current envelope detector coupled to the LDO pass transistor configured to generate a binary signal representative of the periodic waveform of the communication signal based on the current signal; and
a processor coupled to the current envelope detector configured to process the binary signal generated by the current envelope detector.

10. The apparatus of claim 9, wherein the current envelope detector further includes:
a current sensor configured to generate a voltage signal, the voltage signal corresponding to the current received from the LDO;
a signal analyzer configured to compare the voltage signal to a first threshold and a second threshold; and
a digital signal generator configured to generate the binary signal, the binary signal generated based on the comparison of the voltage signal to the first threshold and the second threshold.

11. The apparatus of claim 10, wherein the digital signal generator is further to:
set the binary signal high when the voltage signal is a quantity above the first threshold;
set the binary signal low when the voltage signal is a quantity below the second threshold; and
set the binary signal to a previous value when the voltage signal is a quantity below the first threshold and a quantity above the second threshold.

12. The apparatus of claim 9, wherein the periodic waveform of the communication signal that enables communication between the antenna and the processor includes Digital Satellite Equipment Control (DiSEqC) communication.

13. A method comprising:
distributing a communication signal having a periodic waveform representative of communication from an antenna;
sensing a current signal on a low dropout regulator (LDO) pass transistor correlated to the periodic waveform of the communication signal;
converting the current signal to a binary signal based on a threshold; and
processing the binary signal to determine content of the communication distributed by the antenna.

14. The method of claim 13, wherein the threshold includes a first threshold and wherein converting the current signal further includes:
generating a voltage signal corresponding to the current signal;
comparing the voltage signal to the first threshold and a second threshold; and
generating the binary signal, the binary signal generated based on the comparison of the voltage signal to the first threshold and the second threshold.

15. The method of claim 14, wherein generating the binary signal further includes:
setting the binary signal high when the voltage signal is a quantity above the first threshold;
setting the binary signal low when the voltage signal is a quantity below the second threshold; and
setting the binary signal to a previous value when the voltage signal is a quantity below the first threshold and a quantity above the second threshold.

16. The method of claim 13, wherein the communication distributed by the antenna is Digital Satellite Equipment Control (DiSEqC) communication.

17. A non-transitory computer readable storage medium comprising instructions that, when implemented, cause a machine to at least:
distribute a communication signal having a periodic waveform representative of communication from an antenna;
sense a current signal on a low dropout regulator (LDO) pass transistor correlated to the periodic waveform of the communication signal;
convert the current signal to a binary signal based on a threshold; and
process the binary signal to determine content of the communication distributed by the antenna.

18. The non-transitory computer readable storage medium of claim 17, wherein the threshold includes a first threshold and wherein the instructions to convert the current signal, when implemented, further cause the machine to:
generate a voltage signal corresponding to the current signal;
compare the voltage signal to the first threshold and a second threshold; and
generate the binary signal, the binary signal generated based on the comparison of the voltage signal to the first threshold and the second threshold.

19. The non-transitory computer readable storage medium of claim 18, wherein the instructions to generate the binary signal, when implemented, further cause the machine to:
set the binary signal high when the voltage signal is a quantity above the first threshold;
set the binary signal low when the voltage signal is a quantity below the second threshold; and set the binary signal to a previous value when the voltage signal is a quantity below the first threshold and a quantity above the second threshold.

20. The non-transitory computer readable storage medium of claim 17, wherein the communication distributed by the antenna is Digital Satellite Equipment Control (DiSEqC) communication.

\* \* \* \* \*